(12) United States Patent
Pavlovski et al.

(10) Patent No.: US 9,913,133 B2
(45) Date of Patent: *Mar. 6, 2018

(54) MULTI-DEVICE MONITORING AND CONTROL USING INTELLIGENT DEVICE CHANNEL SHARING

(71) Applicant: International Business Machines Corporation, Armonk, NY (US)

(72) Inventors: Christopher J. Pavlovski, Westlake (AU); Laurence J. Plant, North Balwyn (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 69 days.

This patent is subject to a terminal disclaimer.

(21) Appl. No.: 15/172,495

(22) Filed: Jun. 3, 2016

(65) Prior Publication Data

US 2016/0286387 A1 Sep. 29, 2016

Related U.S. Application Data

(63) Continuation of application No. 14/496,968, filed on Sep. 25, 2014, now Pat. No. 9,398,479, which is a
(Continued)

(51) Int. Cl.
*H04W 8/26* (2009.01)
*H04W 8/18* (2009.01)
(Continued)

(52) U.S. Cl.
CPC .............. *H04W 8/26* (2013.01); *H04L 45/72* (2013.01); *H04L 45/745* (2013.01);
(Continued)

(58) Field of Classification Search
CPC ......... H04W 8/26; H04W 8/04; H04W 8/183; H04W 8/186; H04W 24/08; H04W 60/02;
(Continued)

(56) References Cited

U.S. PATENT DOCUMENTS 6,512,751 B1 1/2003 Struhsaker et al.
8,364,948 B2 1/2013 Grebus et al.
(Continued)

FOREIGN PATENT DOCUMENTS

CN 1725735 A 1/2006
CN 101753466 A 6/2010
(Continued)

OTHER PUBLICATIONS

Author Unknown, Network Address Translation, Wikipedia, the free encyclopedia, Sep. 29, 2011, pp. 1-14, Wikimedia Foundation, Inc., Published on the World Wide Web at: http://en.wikipedia.org/wiki/Network_address_translation.
(Continued)

*Primary Examiner* — Ian N Moore
*Assistant Examiner* — Ronald H Davis
(74) *Attorney, Agent, or Firm* — Lee Law, PLLC; Christopher B. Lee

(57) ABSTRACT

A physical network address of one of a set of wireless customer-premise monitoring devices is translated to a shared logical device physical network address in response to receipt of a data packet addressed to the physical network address. The shared logical device physical network address forms a logical device group and physically addresses each of the set of wireless customer-premise monitoring devices over a single communication channel of a wireless cellular network. The wireless customer-premise monitoring devices are configured with each of a shared-identity subscriber identity module (SIM) that uses the shared logical device
(Continued)

physical network address and an individual-identity SIM that uses the physical network address. The physical network address of the one of the set of wireless customer-premise monitoring devices is embedded within the data packet addressed to the shared logical device physical network address. The data packet is sent to the shared logical device physical network address.

15 Claims, 8 Drawing Sheets

Related U.S. Application Data continuation of application No. 13/275,231, filed on Oct. 17, 2011, now Pat. No. 8,879,483.

(51) Int. Cl.
| | |
|---|---|
| H04L 29/12 | (2006.01) |
| H04L 29/08 | (2006.01) |
| H04W 24/08 | (2009.01) |
| H04L 12/741 | (2013.01) |
| H04M 11/00 | (2006.01) |
| H04W 8/04 | (2009.01) |
| H04W 60/02 | (2009.01) |
| H04L 12/721 | (2013.01) |
| H04W 72/04 | (2009.01) |
| H04W 84/18 | (2009.01) |

(52) U.S. Cl.
CPC ........ *H04L 61/2503* (2013.01); *H04L 67/125* (2013.01); *H04M 11/007* (2013.01); *H04W 8/04* (2013.01); *H04W 8/183* (2013.01); *H04W 8/186* (2013.01); *H04W 24/08* (2013.01); *H04W 60/02* (2013.01); *H04W 72/048* (2013.01); *H04Q 2209/60* (2013.01); *H04W 84/18* (2013.01)

(58) Field of Classification Search
CPC .... H04W 72/048; H04L 45/72; H04L 45/745; H04L 61/2503; H04L 67/125; H04M 11/007
See application file for complete search history.

(56) References Cited

U.S. PATENT DOCUMENTS

| | | |
|---|---|---|
| 2005/0057370 A1 | 3/2005 | Warrior et al. |
| 2005/0207421 A1 | 9/2005 | Suzuki |
| 2006/0253619 A1 | 11/2006 | Torudbakken et al. |
| 2007/0160000 A1 | 7/2007 | Dobrowski et al. |
| 2007/0160001 A1 | 7/2007 | Lovegren et al. |
| 2007/0180123 A1 | 8/2007 | Bennett |
| 2007/0243872 A1 | 10/2007 | Gallagher et al. |
| 2007/0248085 A1 | 10/2007 | Volpano |
| 2008/0200179 A1 | 8/2008 | Jen |
| 2008/0288578 A1 | 11/2008 | Silfverberg |
| 2009/0059848 A1 | 3/2009 | Khetawat et al. |
| 2009/0088211 A1 | 4/2009 | Kim |
| 2009/0311995 A1 | 12/2009 | Himmelstein |
| 2010/0232414 A1 | 9/2010 | Jeon |
| 2011/0053619 A1 | 3/2011 | Shaheen et al. |
| 2011/0249636 A1 | 10/2011 | Cherian et al. |
| 2013/0005394 A1 | 1/2013 | Geary et al. |
| 2013/0023235 A1 | 1/2013 | Fan et al. |

FOREIGN PATENT DOCUMENTS

| | | |
|---|---|---|
| CN | 101998670 A | 3/2011 |
| CN | 102215121 A | 10/2011 |
| JP | 19-550392 A | 6/2009 |
| JP | 21-138453 A | 12/2010 |
| JP | 22-532433 A | 3/2013 |
| WO | 2011041913 A1 | 4/2011 |
| WO | 2011/051182 A1 | 5/2011 |
| WO | 2011127320 A1 | 10/2011 |

OTHER PUBLICATIONS

PCT International Searching Authority, International Search Report and Written Opinion for PCT Application No. PCT/IB2012/055537, dated Mar. 14, 2013, pp. 1-7, Beijing, People's Republic of China.
United Kingdom Intellectual Property Office, Examination Report for Application No. GB1406656.7, Mar. 24, 2016, pp. 1-3, South Wales, UK.
United States Patent and Trademark Office, Office Action for U.S. Appl. No. 13/275,231, dated Jan. 17, 2014, pp. 1-30, Alexandria, VA, USA.
United States Patent and Trademark Office, Notice of Allowance for U.S. Appl. No. 13/275,231, Jul. 2, 2014, pp. 1-23, Alexandria, VA, USA.
United States Patent and Trademark Office, Office Action for U.S. Appl. No. 13/433,943, Jan. 17, 2014, pp. 1-28, Alexandria, VA, USA.
United States Patent and Trademark Office, Notice of Allowance for U.S. Appl. No. 13/433,943, Jun. 27, 2014, pp. 1-16, Alexandria, VA, USA.
United States Patent and Trademark Office, Office Action for U.S. Appl. No. 14/496,968, Jul. 6, 2015, pp. 1-21, Alexandria, VA, USA.
United States Patent and Trademark Office, Office Action for U.S. Appl. No. 14/496,968, Jan. 21, 2016, pp. 1-19, Alexandria, VA, USA.
United States Patent and Trademark Office, Notice of Allowance for U.S. Appl. No. 14/496,968, Apr. 15, 2016, pp. 1-11, Alexandria, VA, USA.
State Intellectual Property Office of the Peoples Republic of China, Examination Report for Chinese Application No. 201280051076.6 (English translation not available), Jan. 3, 2017, pp. 1-6, P. R. China.
United States Patent and Trademark Office, Office Action for U.S. Appl. No. 15/172,553, Aug. 28, 2017, pp. 1-48, Alexandria, VA, USA.

US 9,913,133 B2

MULTI-DEVICE MONITORING AND CONTROL USING INTELLIGENT DEVICE CHANNEL SHARING

BACKGROUND

The present invention relates to multiple device monitoring and control. More particularly, the present invention relates to multi-device monitoring and control using intelligent device channel sharing.

Electrical utility power is distributed for consumption using electrical distribution networks that interconnect an electrical utility with electric power customers. Electric meters interface with the electrical distribution networks at electric power customer premises and measure the amount of electricity consumed over time. The measurements of electricity consumption are used for billing the electric power customers for consumed electrical power.

SUMMARY

A method includes translating, in response to receipt of a first data packet addressed to a physical network address of one of a plurality of wireless customer-premise monitoring devices from an application server, the physical network address to a shared logical device physical network address that forms a logical device group and that physically addresses each of the plurality of wireless customer-premise monitoring devices over a single wireless communication channel of a wireless cellular network, and where wireless customer-premise monitoring devices within the plurality of wireless customer-premise monitoring devices are configured with each of: a shared-identity subscriber identity module (SIM) that operates to communicate via the shared logical device physical network address; and an individual-identity SIM that operates to communicate via the physical network address of the respective one of the plurality of wireless customer-premise monitoring devices; and where the method further includes receiving wireless session information for cellular communication with the logical device group from the one of the plurality of wireless customer-premise monitoring devices; storing the wireless session information; embedding the physical network address of the one of the plurality of wireless customer-premise monitoring devices within the first data packet addressed to the shared logical device physical network address; and sending the first data packet to the shared logical device physical network address.

A system includes a memory; a communication module, and a processor programmed to translate, in response to receipt of a first data packet addressed to a physical network address of one of a plurality of wireless customer-premise monitoring devices from an application server, the physical network address to a shared logical device physical network address that forms a logical device group and that physically addresses each of the plurality of wireless customer-premise monitoring devices over a single wireless communication channel of a wireless cellular network, and where wireless customer-premise monitoring devices within the plurality of wireless customer-premise monitoring devices are configured with each of: a shared-identity subscriber identity module (SIM) that operates to communicate via the shared logical device physical network address; and an individual-identity SIM that operates to communicate via the physical network address of the respective one of the plurality of wireless customer-premise monitoring devices; and the processor is further programmed to: receive, via the communication module, wireless session information for cellular communication with the logical device group from the one of the plurality of wireless customer-premise monitoring devices; store the wireless session information in the memory; embed the physical network address of the one of the plurality of wireless customer-premise monitoring devices within the first data packet addressed to the shared logical device physical network address; and send, via the communication module, the first data packet to the shared logical device physical network address.

A computer program product includes a computer readable storage medium including computer readable program code, where the computer readable program code when executed on a computer causes the computer to translate, in response to receipt of a first data packet addressed to a physical network address of one of a plurality of wireless customer-premise monitoring devices from an application server, the physical network address to a shared logical device physical network address that forms a logical device group and that physically addresses each of the plurality of wireless customer-premise monitoring devices over a single wireless communication channel of a wireless cellular network, and where wireless customer-premise monitoring devices within the plurality of wireless customer-premise monitoring devices are configured with each of: a shared-identity subscriber identity module (SIM) that operates to communicate via the shared logical device physical network address; and an individual-identity SIM that operates to communicate via the physical network address of the respective one of the plurality of wireless customer-premise monitoring devices; and the computer readable program code when executed on the computer further causes the computer to: receive wireless session information for cellular communication with the logical device group from the one of the plurality of wireless customer-premise monitoring devices; and store the wireless session information; embed the physical network address of the one of the plurality of wireless customer-premise monitoring devices within the first data packet addressed to the shared logical device physical network address; and send the first data packet to the shared logical device physical network address.

DETAILED DESCRIPTION

Figure 1:
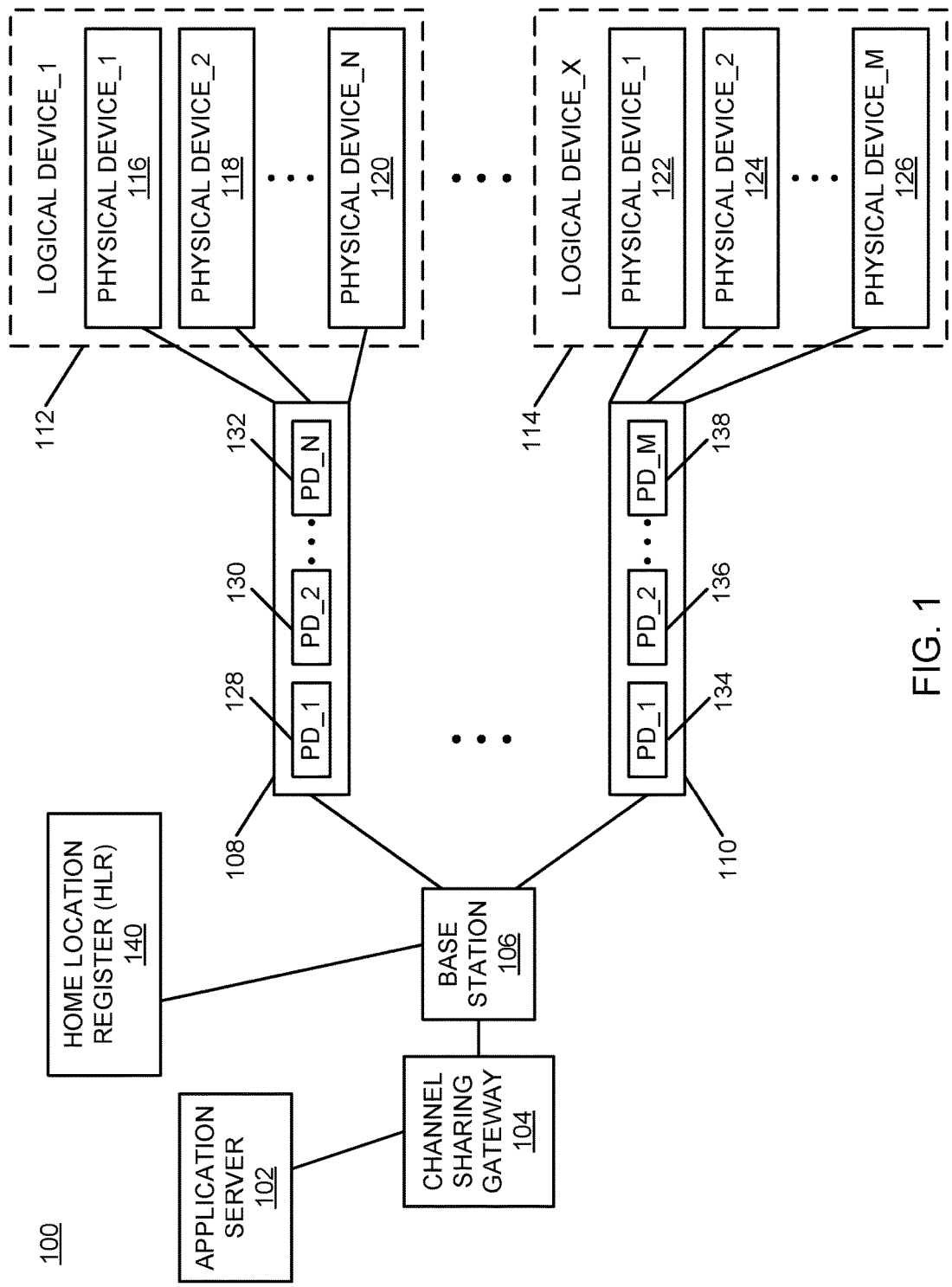
FIG. 1 is a block diagram of an example of an implementation of a system for automated multi-device monitoring and control using intelligent device channel sharing according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides multi-device monitoring and control using intelligent device channel sharing. A shared logical device physical network address is assigned to each of a group of wireless physical devices and a single wireless communication channel is used to communicate with all devices in the group. The group of wireless physical devices forms a logical device group addressable via the shared logical device physical network address within a wireless network. The shared logical device physical network address is used for network level communications with the group over the single wireless communication channel. A channel sharing gateway intercepts messaging between a server, such as an application server, and the wireless physical devices. For messages intercepted from the server, the physical network addresses of the wireless physical devices are translated to the shared logical device physical network address with which the wireless physical devices are logically grouped. The physical network addresses of the wireless physical devices are embedded within data packets addressed to the shared logical device physical network address and received from the physical devices via the shared logical device physical network address. For messages intercepted from the physical devices, the shared logical device physical network address is used as source addresses of the data packets and the shared logical device physical network addresses are translated to the embedded physical network addresses of the wireless physical devices. The phrase "physical device" may be used interchangeably with "wireless physical device" herein for both the singular and plural contexts. Wireless physical devices, as described herein, may be used for example in monitoring and control of smart grid applications, such as monitoring and controlling electrical power distribution networks, and other networks including water distribution networks, and gas distribution networks. As such, the wireless physical devices may for example form at least a portion of a network of smart grid electrical power distribution system monitoring devices, a network of water distribution system monitoring devices, and a network of gas distribution system monitoring devices, among other possible implementations.

The present subject matter may be utilized, for example, where a number of devices, such as smart grid or other monitored devices, exceeds a number of available channels within a wireless network. Additionally, the present subject matter is applicable where channel sharing is desired to reduce capital expenditures for wireless infrastructure, such as cell sites, to accommodate large numbers of smart grid or other monitored devices. The present subject matter may further be applied where channels may be shared to conserve wireless access charges, and may be utilized where the respective wireless devices operate with data requirements that are less than data capacity (bandwidth) of the respective wireless channels. The present subject matter applies to many forms of wireless networks, including cellular networks, wireless broadband access technologies such as worldwide interoperability for microwave access (WIMAX®) networks, or other wireless networks that may have channel limitations as the number of access devices increases.

For cellular applications, physical devices are equipped with two subscriber identity module (SIM) cards. Multiple physical devices are configured as a logical pool/group. A first "shared-identity" SIM module in each physical device within a logical group is configured for shared communications over a wireless network via a shared logical device physical network address. Multiple wireless communication sessions between an application-level device, such as an application server, and the physical devices within the logical group are multiplexed over a single wireless channel by a channel sharing gateway. A second "individual-identity" SIM module in each physical device provides individual access to the wireless network via a separate wireless channel and is used by wireless physical devices to obtain shared wireless channel access information (e.g., session keys, etc.) from the channel sharing gateway for use during multiplexed communications using the shared-identity SIM card. The channel sharing gateway also uses communications via the second individual-identity SIM card of each physical device for configuration and upgrade of individual wireless physical devices, as described in more detail below.

Using the dual SIM technology described herein, a first physical device that attempts to register with a home location register (HLR) using the shared-identity SIM may be granted registration and provided with session information. This initial registrant may then communicate with the channel sharing gateway and provide the session information to the channel sharing gateway. Subsequent physical devices that attempt to register with the HLR using the shared-identity SIM may be denied registration. Such devices may then register with the HLR using the individual-identity SIM to allow communications with the channel sharing gateway and may obtain the session information for use with the shared-identity SIM from the channel sharing gateway. The devices may then configure the shared-identity SIM with the obtained session information and switch to the shared-identity SIM for multiplexed communications as part of the respective logical device group.

As described above, the multi-device monitoring and control using intelligent device channel sharing is implemented by grouping wireless physical devices into logical device pools/groups. Each device within a logical group is assigned to a common logical device identity (i.e., shared logical device physical network address) for physical communications using the shared-identity SIM card. The channel sharing gateway interfaces between the application server and a wireless network element, such as a base station, that ultimately interconnects with the physical devices within the logical device group. The channel sharing gateway operates to multiplex the multiple wireless communication sessions over the single shared communication channel using the shared-identity SIM card, as described above and in more detail below. The channel sharing gateway also operates to individually communicate with physical devices using the second individual-identity SIM card over separate wireless channels.

The channel sharing gateway intercepts messages from the application server that are destined for individual physical devices and converts the messages to use the logical device identity as the destination address. The channel sharing gateway encodes a physical device identifier of the respective physical device(s) to which the messages were originally sent by the application server into a payload of data packets that are physically addressed to the common shared logical device identity. Each physical device receives each message targeted to the logical device identity and parses the payload for the physical device identifier. The physical device identifier within the payload allows each physical device within a group to logically distinguish communications that are intended for the respective physical device that are received via the logical device identity of the group.

The channel sharing gateway causes each physical device to initiate transmission of data packets generated by the physical device (e.g., monitored data, status, etc.) by sending a token to the respective physical devices within data packets that are logically addressed to the respective physical devices using the physical device identifiers encoded within the payload of the respective messages. Each physical device responds with its physical device identifier encoded into a payload of a response data packet that is physically addressed to the channel sharing gateway using the common shared logical device identity.

In response to receipt of a message addressed to the channel sharing gateway from the common shared logical device identity that is destined for the application server, the channel sharing gateway de-multiplexes the shared communication by extracting the physical device identifier from the payload of the response message and converting the source address to the address of the respective physical device. The channel sharing gateway forwards the message to the application server.

As such, network addresses of each wireless physical device are translated for sharing the logical device physical network address and multiple physical devices share a single designated communication channel without modification of the wireless communications infrastructure or modification of an application server device that collects data from the physical devices. Accordingly, the present subject matter may be implemented without modification of either the application server or the wireless network elements (e.g., base stations, etc.).

The physical device identifier that is encoded into the payload of a data packet provides logical addressing for each device above the network physical connection layer for packets that are physically addressed to the logical device identity. Packet addressing for packets directed to the common shared logical device identity may be decoded by the respective devices using the respective physical device identifier.

Multiple physical devices may be addressed within a payload of a single logical message. For example, broadcast messages may be used to configure, reset, or otherwise interact with a number of devices within a logical group. Other variations are possible and all are considered within the scope of the present subject matter.

It should be noted that, between the channel sharing gateway and the logical group, the physical address of the logical group that is used by the channel sharing gateway for communicating via the wireless channel represents a logical address for the group of devices. Conversely, the physical addresses of the devices encoded into the payload of the respective messages represent logical addresses of the physical devices. As such, the present description to some degree inverts the concepts of logical and physical addressing. For example, a message that is carried over the wireless communication channel is physically addressed to a logical group. However, individual devices are logically addressed within the payload of the message (addressed to the logical group) using physical device identifiers of the respective physical devices.

With further reference to physical device message processing, as described above, in response to receipt of a data packet/message addressed to the shared logical device identity, each physical device within the logical device pool/group opens the data packet addressed to the logical device and examines the physical device identifier within the payload to determine whether the packet is logically addressed to (e.g., intended for) the respective physical device. If the packet is not intended for the respective physical device, the packet may be discarded. If the packet is intended for the respective physical device, the packet is passed to the device application layer that is executed by a processor device of the physical device for processing. The device application layer determines the processing requested by the packet/message. The requested processing may include configuring the physical device for operations, reporting status (e.g., operational, fault conditions, etc.), reporting measurements (e.g., power readings), or other processing as appropriate for a given implementation.

When sending packets to a monitoring device, such as an application server, the application layer that is executed by processing device of the respective physical device encapsulates data generated by the physical device on behalf of the monitoring device into a data packet/message that appears to have come from the logical device. The data may include response information (e.g., acknowledgement(s), measurement(s), etc.) to messages that are received or information that is configured to be sent at a particular time (e.g., measurement(s), etc.). The application layer waits until it receives a token from the channel sharing gateway via the shared communication channel that signals that it is the respective device's turn to transmit data. The application layer then forwards the formed packet payload or packet to the network layer to be sent to the monitoring device for processing. The network layer packages the data into a network layer packet/message that includes the physical device identifier in the payload and that has the logical address of the logical group as the source address. The network layer addresses the network layer packet/message to the application server and forwards the network layer packet/message. As described above, the channel sharing gateway intercepts the message destined for the application server and converts the source address of the logical group to represent the source address of the physical device using the payload-encoded physical device identifier of the respective physical device.

It should be noted that the physical devices may alternatively directly address the channel sharing gateway and encode the address of the application server within the payload as a destination address. In such an implementation, the channel sharing gateway may convert both the source and destination addresses from the logical group and channel sharing gateway, respectively, to the physical device and application server. Additionally, the channel sharing gateway may document or track the messaging sessions between the application server and the respective physical devices within the logical device group to expedite the return message service de-multiplexing, such as via a logical communication session table or other data structure stored within a memory. Alternatively, the channel sharing gateway may perform full real-time processing to multiplex and de-multiplex communication sessions and messages without tracking outstanding communication sessions, as appropriate for a given implementation.

It should be noted that the token may further be implemented as the physical device identifier for implementations with physical devices that are configured to send data routinely. Alternatively, the token may be implemented as an additional data field within the payload as appropriate for the given implementation. As such, many possible variations exist for logical device communications between the channel sharing gateway and physical devices over a shared communication channel, and all such possible variations are considered within the scope of the present subject matter.

Encryption may be used to prevent devices that have been tampered with from maliciously reading packets/messages not intended for them. Any encryption algorithm suitable for the intended purpose may be used as appropriate for the given implementation.

In view of the description above and as described in more detail below, multiple devices may share a single wireless channel and operate with respect to the wireless channel as a single logical device, and may simultaneously access and use the available capacity of the wireless channel. The channel sharing gateway multiplexes multiple wireless communications sessions using a form of network address translation (NAT), as described in more detail below, over one or more available physical wireless channels. The channel sharing gateway uses NAT to manipulate data packets/messages communicated between the application server and the respective wireless physical devices by encapsulating the data packet for the physical device into a packet for the logical device physical address with which the physical device is logically associated. The channel sharing gateway maintains a register of physical devices and logical device associations using a data structure stored within a memory, as appropriate for a given implementation.

As described above, the present subject matter may be utilized, for example, where a number of smart grid or other monitored devices exceeds a number of available channels within a wireless network. The present subject matter may further be applied where channels may be shared to conserve wireless access charges, and may be utilized where the respective wireless devices operate with data requirements that are less than data capacity (bandwidth) of the respective wireless channels.

Additionally, again with reference to a cellular implementation, multiple channels may be used for communication to the physical devices within a given logical pool. In such a situation, devices may be controlled to space their transmissions to conserve network bandwidth. Within such an implementation, as each physical device is switched on or begins operation, the device may attempt to connect to the respective network. Each device may be uniquely identified by the network and may be registered in the HLR. The network generates billing records for each physical device. Each device may connect to the channel sharing gateway and identify itself as being a member of a logical pool of devices. The channel sharing gateway may use an Internet protocol (IP) addressing scheme to ensure devices do not send IP packets at the same time using the token-based techniques described herein. The devices may wait to be instructed when to transmit data, with the result that devices communicate serially and not in parallel. As such, bandwidth within the cellular network may be conserved.

It should also be noted that the present description utilizes a smart grid as a monitoring domain and smart grid devices as monitored devices for purposes of example. However, the present subject matter may be applied to other monitoring domains and devices, such as vehicles, vending machines, water distribution networks, telephone company infrastructure, and other systems where monitoring of multiple devices may be desired. Accordingly, all such monitoring domains are considered within the scope of the present subject matter.

To further detail smart grid for purposes of the present examples, smart grid represents an evolution of the electricity/electrical distribution network where information and communications technology are integrated with the electricity power network to monitor, control, and optimize the electricity power network. Within a smart grid implementation, electricity power network components include devices such as transformers, switches, cables, and other componentry. These electricity power network components are monitored by intelligent devices, such as application servers, that gather and communicate electrical status, such as voltage, current, and power over an Internet protocol-based (IP-based) data communications network to remote servers. Smart grid also incorporates network communications and processing features within customer premise-based meters, referred to herein as "smart meters," that relay electricity consumption data and alarms to the electricity supplier.

Within a smart grid implementation, power network information such as events, alarms, meter readings, and other data are captured, reported, and analyzed. The analyzed power network information may result in actions that are undertaken to ensure optimization of the electricity supply, infrastructure, and workforce.

It should be noted that conception of the present subject matter resulted from recognition of certain limitations associated with smart grid network component monitoring. It was recognized that public wireless networks provided by communications service providers (CSPs) are shared by multiple subscribers and businesses. Each device connected to the wireless network has a unique/individual identifier, such as a media access control (MAC) address within the IEEE 802.11 standard, or an international mobile subscriber identity (IMSI) within the global system for mobile communications (GSM) standard. The unique/individual identifier enables calls, data, and messages to be generated, sent, and received by the individual devices. Within conventional wireless networks, one communication channel is consumed per device. This channel remains allocated for the duration of the communication session (which may last as long as the device is switched on) regardless of whether the device continues to communicate or not. It was further recognized that the volume of smart grid devices deployed to monitor an electrical/power distribution network, for example, may far exceed the number of communication channels that a particular cell of a conventional wireless communication system may support. Additionally, using the power distribution network as an example, it was recognized that during an emergency situation such as a hurricane or tornado for example, portions of the electrical distribution network may be inoperative and may need to be repaired. Service personnel may attempt to communicate with large numbers of smart grid devices to diagnose and repair the power distribution network. Further, emergency personnel and other persons may attempt to utilize wireless communication cells using their wireless handheld devices at increased levels during such times, while the utility company service personnel are attempting to access large numbers of devices to determine where power outages exist so that the power distribution network may be brought back online as quickly as possible. However, the ability to connect to all monitored devices may be limited due to increased wireless handheld device usage. Additionally, the traffic load for monitored smart grid devices may be less than the capacity of a given channel used to communicate with the respective devices, which results in bandwidth inefficiencies in current wireless channel usage for smart grid implementations. The present subject matter improves multi-device monitoring and control and channel usage efficiency by providing for intelligent device channel sharing, as described above and in more detail below. As such, improved multi-device monitoring and control may be obtained through the subject matter described herein.

The multi-device monitoring and control using intelligent device channel sharing described herein may be performed in real time to allow prompt monitoring of multiple devices via a wireless communications channel. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for automated multi-device monitoring and control using intelligent device channel sharing. An application server 102 interfaces with a channel sharing gateway 104. The channel sharing gateway 104 operates to multiplex communications from the application server 102 for multiple physical devices, as described in more detail below, over a number of communication channels that is less than the number of physical devices. For purposes of the present example, the number of physical devices is assumed to far exceed the number of available communication channels, such as by an order of magnitude or greater for example. However, it should be understood that the relationship of physical devices to available channels may vary as appropriate for a given implementation. It should additionally be noted that, though the example of FIG. 1 represents certain components, such as a base station described below, that are associated with cellular communications, the present subject matter is also applicable to other wireless domains including but not limited to WIMAX® networks or other wireless networks that may have channel limitations as the number of access devices increase. As such, the present example may be modified as appropriate for the given implementation based upon the description provided herein.

The channel sharing gateway 104 interfaces with a base station 106 to communicate, via multiple communication channels represented as a communication channel 108 through a communication channel 110, with physical devices that are organized into logical pools/groups represented as a logical device_1 112 through a logical device_X 114. The logical device_1 112 includes multiple physical devices represented as a physical device_1 116, a physical device_2 118, through a physical device_N 120. The logical device_X 114 includes multiple physical devices represented as a physical device_1 122, a physical device_2 124, through a physical device_M 126.

For purposes of the present example, the application server 102, the base station 106, and the communication channels 108 through 110 represent components that are not modified to perform the processing described herein. The channel sharing gateway 104 maintains a register of physical devices and the logical device pool/group (e.g., the logical device_1 112 through the logical device_X 114) with which each physical device is associated. The channel sharing gateway 104 utilizes this register to translate addresses between the application server and the respective physical devices.

The channel sharing gateway 104 operates as a multiplexor of multiple wireless communications sessions over the individual communication channels 108 through 110. The channel sharing gateway 104 uses a form of network address translation (NAT) to multiplex "M" logical communications sessions onto "N" available physical wireless channels represented by the communication channels 108 through 110. The channel sharing gateway 104 uses NAT to manipulate data packets communicated between the application server 102 and the physical devices 116 through 126 by encapsulating the data packet for the physical device into a packet addressed to the respective logical device 112 through 114 with which the respective physical device is associated. The channel sharing gateway 104 also passes a token to each physical device to indicate to the respective physical device when that device is to transmit data.

For any given communication sequence, the channel sharing gateway 104 intercepts packets sent from the application server 102 that are physically addressed to physical devices, such as the physical devices 116 through 126. The channel sharing gateway 104 determines within which logical group the respective physical device is located (e.g., the logical device_1 112 through the logical device_X 114) and performs an address translation to physically route the data packets to respective logical device. The channel sharing gateway 104 reformats the data packet/message to physically address the data packet to the respective logical device and places the physical address of the respective physical device within the payload of the packets addressed to the respective logical device.

Within FIG. 1, the communication channel 108 is shown to include several data packets that are each physically addressed to the logical device_1 112 for purposes of the present example. As can be seen, the communication channel 108 includes a data packet 128 that encapsulates a physical address (PD_1) of physical device_1 116, a data packet 130 that encapsulates a physical address (PD_2) of physical device_2 118, up to a data packet 132 that encapsulates a physical address (PD_N) of physical device_N

120. It is understood that each data packet is physically addressed to the logical device address of the logical device_1 112.

Similarly, the communication channel 110 is shown to include several data packets that are each physically addressed to the logical device_X 114. As can be seen, the communication channel 110 includes a data packet 134 that encapsulates a physical address (PD_1) of physical device_1 122, a data packet 136 that encapsulates a physical address (PD_2) of physical device_2 124, up to a data packet 138 that encapsulates a physical address (PD_M) of physical device_M 126. It is understood that each data packet is physically addressed to the logical device address of the logical device_X 114.

A home location register (HLR) 140 provides registration and other operations within the system 100. As will be described in more detail below, the HLR 140 may be used by devices within any of the logical device_1 112 through the logical device_X 114 for registration activities and session information (e.g., session key) sharing among physical devices within the respective logical device. For example, a first physical device to attempt to register with the HLR 140 using the shared-identity SIM may be granted registration and provided with session information. This initial registrant may then communicate with the channel sharing gateway 104 and provide the session information to the channel sharing gateway 104. Subsequent physical devices that attempt to register with the HLR 140 using the shared-identity SIM may be denied registration. Such devices may then register with the HLR 140 using the individual-identity SIM to allow communications with the channel sharing gateway 104 and obtain the session information for use with the shared-identity SIM from the channel sharing gateway 104. The devices may then configure the shared-identity SIM with the obtained session information and switch to the shared-identity SIM for communications as described herein as part of the respective logical device.

As will be described in more detail below in association with FIG. 2 through FIG. 7, the channel sharing gateway 104 provides automated multi-device monitoring and control using intelligent device channel sharing. The automated multi-device monitoring and control using intelligent device channel sharing is based upon bi-directional interception of data packets/messages between the application server 102 and physical devices and bi-directional address translation. As such, multiple devices may use one communication channel and cut down on traffic and bandwidth consumption. The automated multi-device monitoring and control using intelligent device channel sharing may be implemented without modification of wireless network infrastructure and may reduce up-fit costs as increasing numbers of wireless physical devices are deployed within wireless networking domains.

It should be noted that the channel sharing gateway 104 may be a portable computing device or a desktop or rack-mounted computing device, as appropriate for a given implementation. For a portable computing device implementation, the channel sharing gateway 104 may be portable either by a user's ability to move the channel sharing gateway 104 to different locations, or by the channel sharing gateway 104's association with a portable platform, such as a plane, train, automobile, or other moving vehicle. It should also be noted that the channel sharing gateway 104 may be any computing device capable of processing information as described above and in more detail below. For example, the channel sharing gateway 104 may include devices such as a server, a personal computer (e.g., desktop, laptop, etc.) or any other device capable of processing information as described in more detail below.

Figure 2:
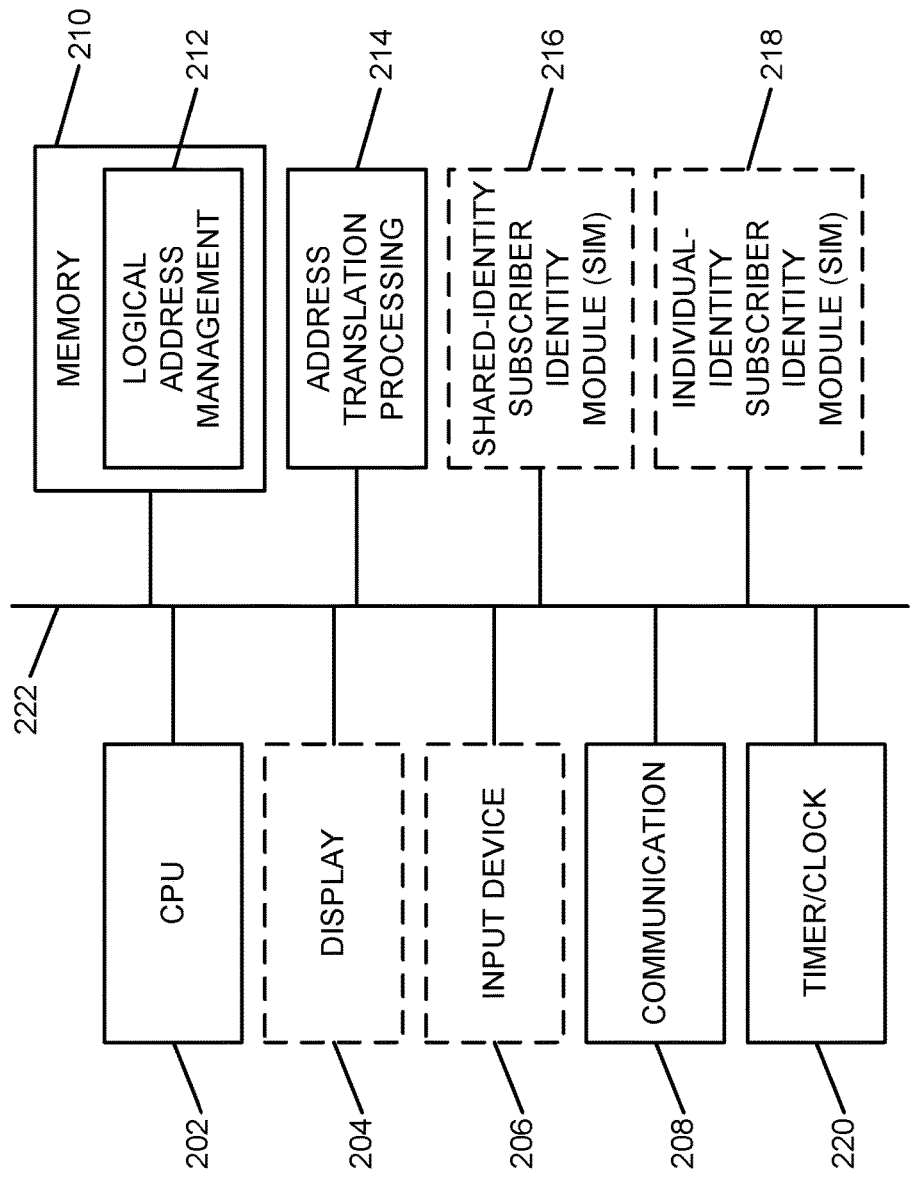
FIG. 2 is a block diagram of an example of an implementation of a core processing module capable of performing automated multi-device monitoring and control using intelligent device channel sharing according to an embodiment of the present subject matter.

FIG. 2 is a block diagram of an example of an implementation of a core processing module 200 capable of performing automated multi-device monitoring and control using intelligent device channel sharing. The core processing module 200 may be associated with each of the channel sharing gateway 104 and with any of the physical devices 116 through 126, as appropriate for a given implementation. Further, the core processing module 200 may provide different and complementary processing of logical address mapping, and messaging conversions and processing, in association with each implementation, as described above and in more detail below. For example, the channel sharing gateway 104 may perform address translations and a physical device, such as the physical device_1 116 through the physical device_M 126, may process messages with the translated addresses and respond with messages addressed in a format that may be reverse translated by the channel sharing gateway 104

For any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, or any other type of input device by which the user may interact with and respond to information on the display 204.

It should be noted that the display 204 and the input device 206 are illustrated with a dashed-line representation within FIG. 2 to indicate that they may be optional components for the core processing module 200 for certain implementations. Accordingly, the core processing module 200 may operate as a completely automated embedded device without direct user configurability or feedback. However, the core processing module 200 may also provide user feedback and configurability via the display 204 and the input device 206, respectively.

A communication module 208 provides interconnection capabilities that allow the core processing module 200 to communicate with other modules within the system 100. The communication module 208 may include any electrical, protocol, and protocol conversion capabilities useable to provide the interconnection capabilities. Though the communication module 208 is illustrated as a component-level module for ease of illustration and description purposes, it should be noted that the communication module 208 may include any hardware, programmed processor(s), and memory used to carry out the functions of the communication module 208 as described above and in more detail below. For example, the communication module 208 may include additional controller circuitry in the form of application specific integrated circuits (ASICs), processors, antennas, and/or discrete integrated circuits and components for performing communication and electrical control activities associated with the communication module 208. Additionally, the communication module 208 may include interrupt-level, stack-level, and application-level modules as appropriate. Furthermore, the communication module 208 may include any memory components used for storage, execution, and data processing for performing processing activities associated with the communication module 208. The communication module 208 may also form a portion of other circuitry described without departure from the scope of the present subject matter.

A memory 210 includes a logical address management storage area 212. For an implementation of the logical address management storage area 212 within the channel sharing gateway 104, the logical address management storage area 212 may store a register of physical devices and physical device associations with logical devices (e.g., logical pools/groups of devices). The register of physical devices and physical device associations with logical devices may be organized in any format appropriate for a given implementation. The register of physical devices and physical device associations with logical devices stores physical addresses of physical devices and mappings between physical device addresses and the respective logical device address of the logical device with which each physical device is associated. The logical address management storage area 212 may also store token patterns, sequencing, and processing information for causing of communications from physical devices within the respective logical device pools. Many other possibilities exist for storage at a channel sharing gateway of information associated with automated multi-device monitoring and control using intelligent device channel sharing, and all are considered within the scope of the present subject matter.

For an implementation of the logical address management storage area 212 within the physical devices 116 through 126, the logical address management storage area 212 may store physical address information for the respective physical device and logical address information for the logical device (e.g., group/pool) with which the respective physical device is located. The logical address management storage area 212 may also store token patterns and processing information for determining when communication has been requested by the channel sharing gateway 104. Many other possibilities exist for storage at a wireless physical device of information associated with automated multi-device monitoring and control using intelligent device channel sharing, and all are considered within the scope of the present subject matter.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

An address translation processing module 214 is also illustrated. For an implementation of the address translation processing module 214 within the channel sharing gateway 104, the address translation processing module 214 provides address translation configuration for the logical address management storage area 212. The address translation processing module 214 also intercepts messages/packets and multiplexing/de-multiplexing of addresses between the application server 102 and the logical devices with which physical devices are logically grouped/pooled. The address translation processing module 214 implements the automated multi-device monitoring and control using intelligent device channel sharing of the core processing module 200.

For an implementation of the address translation processing module 214 within the physical devices 116 through 126, the address translation processing module 214 interprets received messages to determine whether the message is directed to the respective physical device with which the address translation processing module 214 is implemented. In response to determining that a message is directed to the respective physical device, the address translation processing module 214 determines whether the message is a configuration message or a token that indicates the respective physical module is to begin sending data. It is also understood that, in association with the address translation processing capabilities, the address translation processing module 214 may also operate to collect data (e.g., measurements, readings, etc.) for the respective physical device or, alternatively, the CPU 202 may be implemented to perform the respective data collection processing as appropriate for a given implementation. Additionally, it is understood that memory for collection of data may be allocated with the memory 210 for any such implementation.

Though the address translation processing module 214 is illustrated as a component-level module for ease of illustration and description purposes, it should be noted that the address translation processing module 214 may include any hardware, programmed processor(s), and memory used to carry out the functions of this module as described above and in more detail below. For example, the address translation processing module 214 may include additional controller circuitry in the form of application specific integrated circuits (ASICs), processors, and/or discrete integrated circuits and components for performing communication and electrical control activities associated with the respective devices. Additionally, the address translation processing module 214 may include interrupt-level, stack-level, and application-level modules as appropriate. Furthermore, the address translation processing module 214 may include any memory components used for storage, execution, and data processing for performing processing activities associated with the module.

It should also be noted that the address translation processing module 214 may form a portion of other circuitry described without departure from the scope of the present subject matter. Further, the address translation processing module 214 may alternatively be implemented as an application stored within the memory 210. In such an implementation, the address translation processing module 214 may include instructions executed by the CPU 202 for performing the functionality described herein. The CPU 202 may execute these instructions to provide the processing capabilities described above and in more detail below for the core processing module 200. The address translation processing module 214 may form a portion of an interrupt service routine (ISR), a portion of an operating system, a portion of a browser application, or a portion of a separate application without departure from the scope of the present subject matter.

As described above, physical devices are equipped with two subscriber identity module (SIM) cards and multiple physical devices are configured as a logical pool/group using one of the SIM cards. A first "shared-identity" SIM 216 in each physical device within a logical group is configured for shared communications over a wireless network. Multiple wireless communication sessions between an application-level device, such as the application server 102, and the physical devices within a logical group are multiplexed over a single wireless channel by the channel sharing gateway 104. A second "individual-identity" SIM 218 in each physical device provides individual access to the wireless network via a separate wireless channel and is used by wireless physical devices to obtain shared wireless channel access information (e.g., session keys, etc.) from the channel sharing gateway 104 for use during multiplexed communications using the shared-identity SIM 216. The channel sharing gateway 104 also uses communications via the second individual-identity SIM 218 of each physical device for configuration and upgrade of individual wireless physical devices, as described above and in more detail below. It should be noted that the shared-identity SIM 216 and the individual-identity SIM 218 are illustrated with a dashed-line representation within FIG. 2 to indicate that they are associated with implementations of the core processing module 200 for physical devices and not for the channel sharing gateway 104. However, it should be noted that the channel sharing gateway 104 may also be addressed directly rather than perform message interception as appropriate for a given implementation. As such, the channel sharing gateway 104 may also have a SIM module without departure from the scope of the present subject matter.

A timer/clock module 220 is illustrated and used to determine timing and date information, such as for use in association with sending tokens to wireless devices to cause/trigger them to report data (e.g., readings, etc.), as described above and in more detail below. As such, the address translation processing module 214 may utilize information derived from the timer/clock module 220 for information processing activities, such as the automated multi-device monitoring and control using intelligent device channel sharing described herein.

The CPU 202, the display 204, the input device 206, the communication module 208, the memory 210, the address translation processing module 214, the shared-identity SIM 216, the individual-identity SIM 218, and the timer/clock module 220 are interconnected via an interconnection 222. The interconnection 222 may include a system bus, a network, or any other interconnection capable of providing the respective components with suitable interconnection for the respective purpose.

While the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a kiosk or other location, while the CPU 202 and memory 210 may be located at a local or remote server. Many other possible arrangements for components of the core processing module 200 are possible and all are considered within the scope of the present subject matter. Accordingly, the core processing module 200 may take many forms and may be associated with many platforms.

FIG. 3 through FIG. 7 described below represent example processes that may be executed by devices, such as the core processing module 200, to perform the automated multi-device monitoring and control using intelligent device channel sharing associated with the present subject matter. Many other variations on the example processes are possible and all are considered within the scope of the present subject matter. The example processes may be performed by modules, such as the address translation processing module 214 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added without departure from the scope of the present subject matter.

Figure 3:
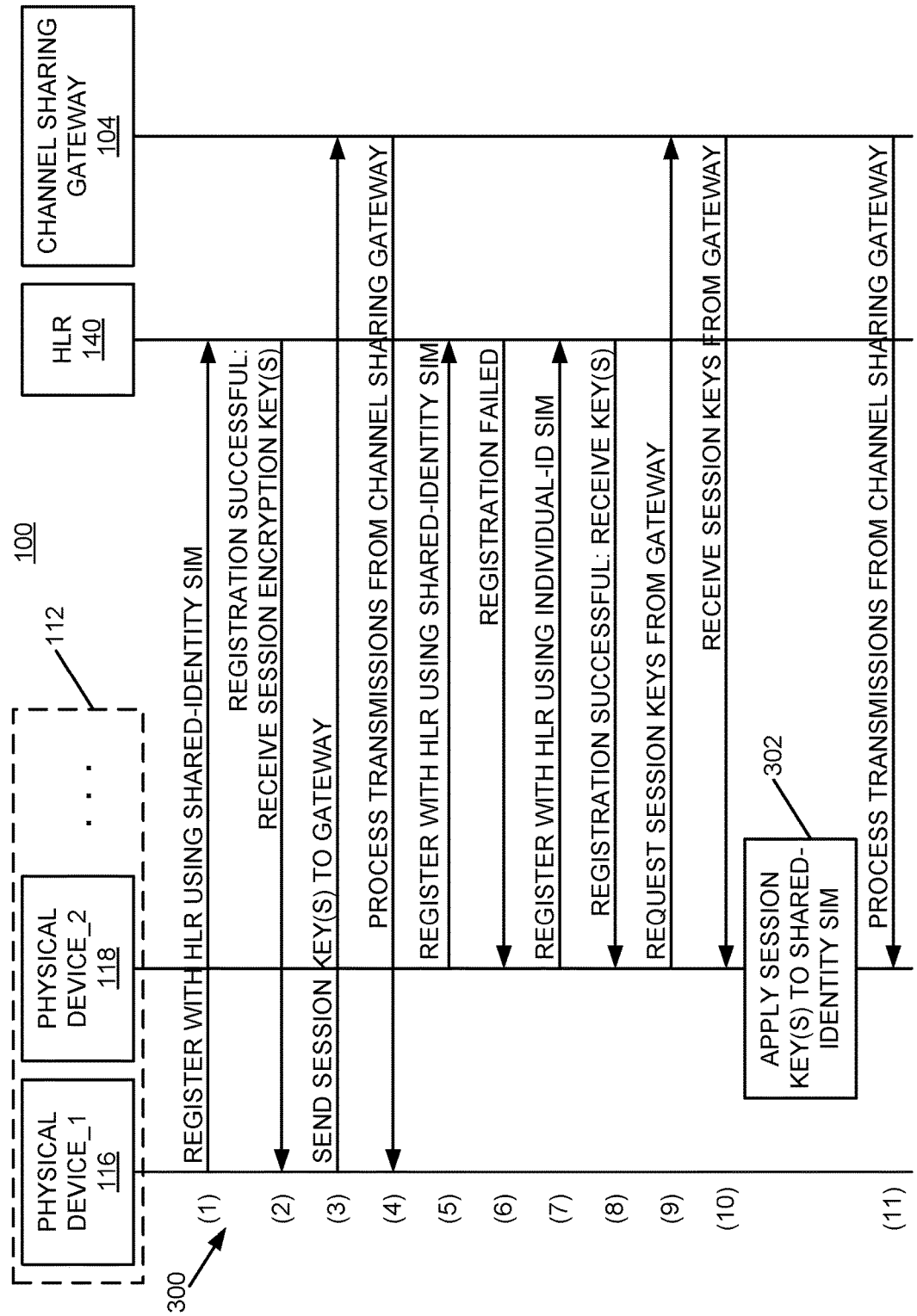
FIG. 3 is a message flow diagram of an example of an implementation of messaging for device interactions for sharing of a shared-identity subscriber identity module (SIM) to implement automated multi-device monitoring and control using intelligent device channel sharing within a cellular network according to an embodiment of the present subject matter.

FIG. 3 is a message flow diagram of an example of an implementation of a messaging 300 for device interactions for sharing of a shared-identity subscriber identity module (SIM) to implement automated multi-device monitoring and control using intelligent device channel sharing within a cellular network. For purposes of the present example, only two devices, the physical device_1 116 and the physical device_2 118, of the logical device_1 112 of FIG. 1 are illustrated due to drawing space limitations within the drawing of FIG. 3. All devices within a physical group may power up and attempt to activate and register with the HLR 140 using the shared-identity SIM 216. However, as described in more detail below, only the first device successfully registers with the HLR 140 using the shared-identity SIM 216. The channel sharing gateway 104 facilitates use of the shared-identity SIM 216 by other physical devices within the logical device_1 112, as described in more detail below.

It is assumed for purposes of example that the physical device_1 116 attempts to activate and register with the HLR 140 within system 100 first and that the physical device_2 118 attempts to activate and register with the HLR 140 second. It is understood that any device within a logical device group may attempt to activate and register first and that the processing described in association with the physical device_2 118 (e.g., the second device to attempt to activate and register for purposes of example) may be performed by any subsequent physical device associated with the logical device_1 112 that attempts to activate and register with the HLR 140 after one device has successfully registered using the shared-identity SIM 216.

Within the example of FIG. 3, the physical device_1 116 powers up or otherwise attempts to activate and register with the HLR 140 using the shared-identity SIM 216 of the physical device_1 116 (line 1). The HLR 140 determines that the shared-identity SIM 216 is not already registered within the system 100 and registers the physical device_1 116 within the system 100. The HLR 140 responds indicating that the registration was successful and sends one or more session encryption keys as appropriate for the given implementation, which are received by the physical device_1 116 (line 2). The physical device_1 116 sends the received session encryption key(s) to the channel sharing gateway 104 (line 3). The channel sharing gateway 104 stores the session encryption key(s) in association with the logical device_1 112 and the physical device_1 116 within the logical address management storage area 212 of the channel sharing gateway 104. The channel sharing gateway 104 begins communications with the physical device_1 116 using the shared-identity SIM 216 and passing one or more tokens to the physical device_1 116 to cause the physical device_1 116 to send data packets (e.g., readings, measurements, status, etc.), and the physical device_1 116 begins processing messaging via the shared-identity SIM 216 (line 4), including any appropriate configuration of the physical device_1 116.

The application server 102 is omitted from FIG. 3 due to space constraints within the drawing figure. However, it is understood that the channel sharing gateway 104 may further communicate messages between the physical device_1 116 and the application server 102, as described above and in more detail below.

The physical device_2 118 powers up or otherwise attempts to activate and register with the HLR 140 using the shared-identity SIM 216 of the physical device_2 118 (line 5). The HLR 140 recognizes that the shared-identity SIM 216 is already registered within the system 100 and refuses registration for the physical device_2 118 as indicated by the registration failure (line 6). The physical device_2 118 then switches to use the individual-identity SIM 218 and attempts to activate and register with the HLR 140 using the individual-identity SIM 218 of the physical device_2 118 (line 7). The HLR 140 determines that the individual-identity SIM 218 is not already registered within the system 100 and registers the physical device_2 118 within the system 100. The HLR 140 responds indicating that the registration was successful and sends one or more session encryption keys as appropriate for the given implementation, which are received by the physical device_2 118 (line 8).

The registered physical device_2 118 then communicates with and requests the session key(s) for using the shared-identity SIM 216 from the channel sharing gateway 104 (line 9). The channel sharing gateway 104 confirms that the physical device_2 118 is associated with and forms a portion of the logical device pool represented by the logical device_1 112. The channel sharing gateway 104 sends the stored session encryption key(s) for the shared-identity SIM 216 to the physical device_2 118 (line 10). The physical device_2 118 applies the received session encryption key(s) to activate the shared-identity SIM 216 for use within the system 100 where the physical device_1 116 has already registered (block 302). The physical device_2 118 begins processing of messages from the channel sharing gateway 104.

The channel sharing gateway 104 continues communications with the physical device_1 116 and the physical device_2 118 via a single shared communication channel, such as the communication channel 108 of FIG. 1, using the shared-identity SIM 216 (lines 4 and 11), including any appropriate configuration of the physical device_2 118, and passing one or more tokens to the physical device_1 116 and the physical device_2 118 to cause the respective devices to send data packets (e.g., readings, measurements, status, etc.).

As noted above, the application server 102 is omitted from FIG. 3 due to space constraints within the drawing figure. However, it is understood that the channel sharing gateway 104 may further communicate messages between the respective physical devices and the application server 102, as described above and in more detail below.

It should also be noted that the channel sharing gateway 104 may also instruct the physical devices to register or maintain registration via the respective individual-identity SIM 218 for purposes of upgrading (e.g., downloading firmware, etc.) to the respective physical devices. As such, the channel sharing gateway 104 may control provisioning of the respective physical devices within logical device pools/groups.

Figure 4:
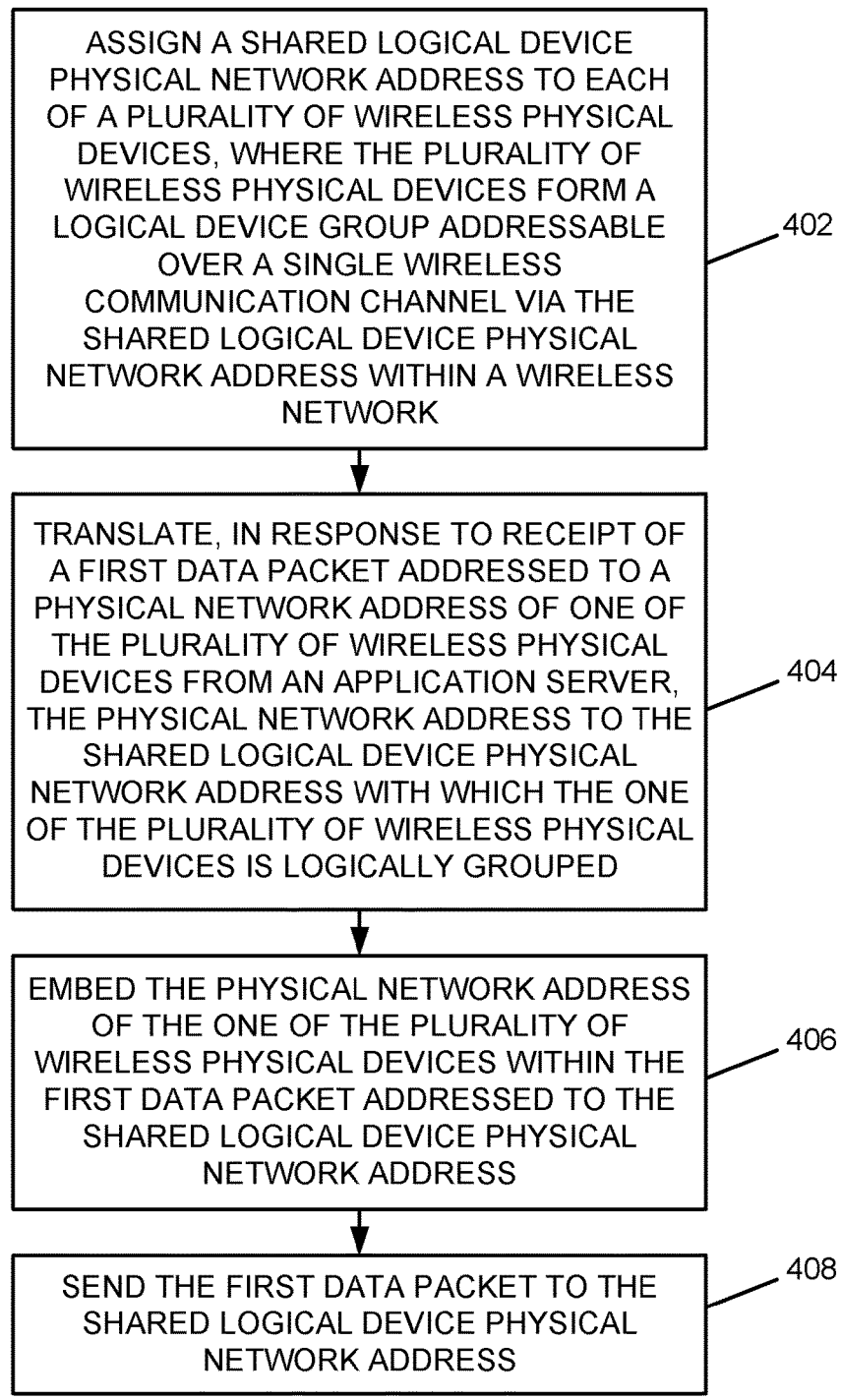
FIG. 4 is a flow chart of an example of an implementation of a process for automated multi-device monitoring and control using intelligent device channel sharing according to an embodiment of the present subject matter.

FIG. 4 is a flow chart of an example of an implementation of a process 400 for automated multi-device monitoring and control using intelligent device channel sharing. At block 402, the process 400 assigns a shared logical device physical network address to each of a plurality of wireless physical devices, where the plurality of wireless physical devices form a logical device group addressable over a single wireless communication channel via the shared logical device physical network address within a wireless network. At block 404, the process 400 translates, in response to receipt of a first data packet addressed to a physical network address of one of the plurality of wireless physical devices from an application server, the physical network address to the shared logical device physical network address with which the one of the plurality of wireless physical devices is logically grouped. At block 406, the process 400 embeds the physical network address of the one of the plurality of wireless physical devices within the first data packet addressed to the shared logical device physical network address. At block 408, the process 400 sends the first data packet to the shared logical device physical network address.

Figure 5:
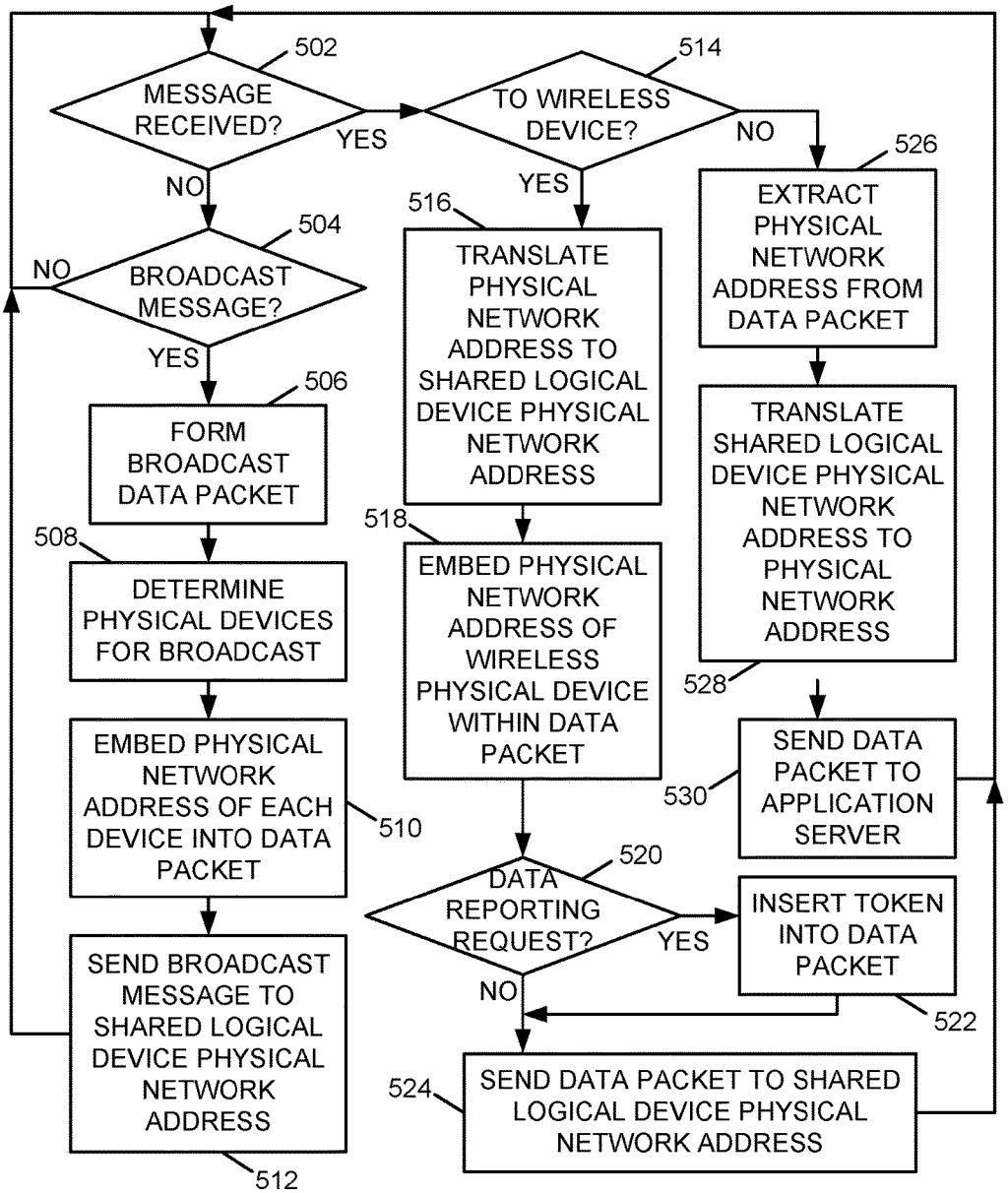
FIG. 5 is a flow chart of an example of an implementation of a process for address translation and messaging interactions at a channel sharing gateway for automated multi-device monitoring and control using intelligent device channel sharing according to an embodiment of the present subject matter.

FIG. 5 is a flow chart of an example of an implementation of a process 500 for address translation and messaging interactions at a channel sharing gateway, such as the channel sharing gateway 104, for automated multi-device monitoring and control using intelligent device channel sharing. Details of a registration process for wireless physical devices to register with the channel sharing gateway 104 as a shared-identity logical device are described below in association with FIG. 7 and has been deferred in favor of the describing the present higher-level messaging example. At decision point 502, the process 500 makes a determination as to whether a message has been received. The determination as to whether a message has been received may be made, for example, in response to interception of a message or data packet from an application server, such as the application server 102, or from a physical device associated with a logical device group/pool, such as the logical device_1 112. In response to determining that a message has not been detected as being received, the process 500 makes a determination at decision point 504 as to whether a broadcast message for any physical devices associated with a logical device group/pool are pending for broadcast. A broadcast message may be pending for broadcast and used, for example, to provide notifications to multiple physical devices associated with one or more logical device groups/pools. A broadcast message may originate from the channel sharing gateway 104 or elsewhere as appropriate for a given implementation. In response to determining that a broadcast message is not pending for any physical devices associated with a logical device group/pool, the process 500 returns to decision point 502 and iterates as described above.

Returning to the description of decision point 504, in response to determining that a broadcast message is pending for broadcast to multiple physical devices within a logical device group/pool, the process 500 forms the broadcast message (e.g., data packet) at block 506. At block 508, the process 500 determines the physical devices to which the broadcast message is to be addressed. At block 510, the process 500 embeds a physical network address of each wireless physical device into the formed data packet, such as within a payload of the data packet. At block 512, the process 500 sends the broadcast message to the shared logical device physical network address (i.e., common logical device identity). The process 500 then returns to decision point 502 and iterates as described above.

As described above and in more detail below, each physical device associated with a logical device group receives and processes each message to determine whether an individual physical device network address of the respective device is embedded within the data packet, which indicates that the data packet is addressed to the respective device. The device may then pass the data packet or payload to higher level functionality within the respective device for processing. In this manner, broadcast messaging may be distributed to multiple devices using a single wireless communication channel by embedding multiple device physical network addresses within a single data packet and sending the data packet to the shared logical device physical network address over the single channel. The process 500 then returns to decision point 502 and iterates as described above.

Returning to the description of decision point 502, in response to determining that a message has been detected as being received, the process 500 makes a determination at decision point 514 as to whether the message has been intercepted in route to a wireless physical device from an application server or to an application server from a wireless physical device. It should be noted that messaging associated with one or more application servers, such as the application server 102, may be processed by a single channel sharing gateway.

In response to determining that the detected message has been intercepted in route to a wireless physical device from an application server, at block 516 the process 500 translates the physical network address of the wireless physical device to which the message is addressed to the shared logical device physical network address with which the wireless physical device is logically grouped. At block 518, the process 500 embeds the physical network address of the one of the plurality of wireless physical devices within the data packet addressed to the shared logical device physical network address. At decision point 520, the process 500 makes a determination as to whether the request is a data reporting request from the respective application server. In response to determining that the request is a data reporting request from the respective application server, the process 500 inserts a token addressed to the respective wireless physical device into the data packet at block 522. As described above and in more detail below, insertion of the token in the data packet causes one of the plurality of wireless physical devices to initiate transmission of data generated by the respective wireless physical device.

It should be noted that a reporting request may be broadcast from the application server 102 and intercepted by the channel sharing gateway 104 via multiple wireless channels from the application server 102. In such a situation, the process 500 may be modified to recognize the reporting and perform a round robin token distribution to cause the respective wireless physical devices to report in turn via the single shared communication channel. However, the application server 102 may also request reporting from single devices over separate channels using the respective individual-identity SIM as appropriate for a given implementation.

It should further be noted that the token may be any data identifier as appropriate for a given implementation. Additionally, as described above, the physical network address of the wireless physical devices may be used as the token. In such an implementation, the processing described in association with decision point 520 and block 522 may be omitted because the "token" (e.g., the physical network address of the wireless physical device) has already been embedded within the data packet at block 518.

In response to either inserting the token into the data packet at block 522 or in response to determining at decision point 520 that the message is not a data reporting request, the process 500 sends the data packet to the shared logical device physical network address at block 524. The process 500 returns to decision point 502 and iterates as described above.

Returning to the description of decision point 514, it should be noted that in response to token insertion (e.g., identifier or address itself) into a data packet that causes data reporting by one or more of the wireless physical devices, the process 500 may further receive the data generated by one or more of the wireless physical devices. The data may be received in a data packet with the shared logical device physical network address as a data packet source address and the physical network address of one of the plurality of wireless physical devices embedded within the payload. As such, in response to determining at decision point 514 that the message has been intercepted in route to an application server from a wireless physical device, the process 500 extracts the physical network address of the wireless physical device from which the message was received from the message payload of the data packet at block 526. At block 528, the process 500 translates the data packet source address from the shared logical device physical network address to the physical network address of the wireless physical device. This processing allows the data packet to appear within the network to have originated from the wireless physical device without translation. At block 530, the process 500 sends the data packet to the application server 102. The process 500 returns to decision point 502 and iterates as described above.

As such, the process 500 intercepts message sent between one or more application servers and multiple wireless physical devices that are logically grouped/pooled. Messaging between the process 500 and the application server(s) occurs over multiple communication channels, while messaging between the wireless physical device and the process 500 occurs over a single communication channel per logical group. The process 500 performs broadcast messaging to wireless physical devices. The process 500 also performs address translation between the shared logical device physical network address of the respective logical device groups/pools and individual wireless device physical network addresses for the respective messaging interfaces.

Figure 6A:
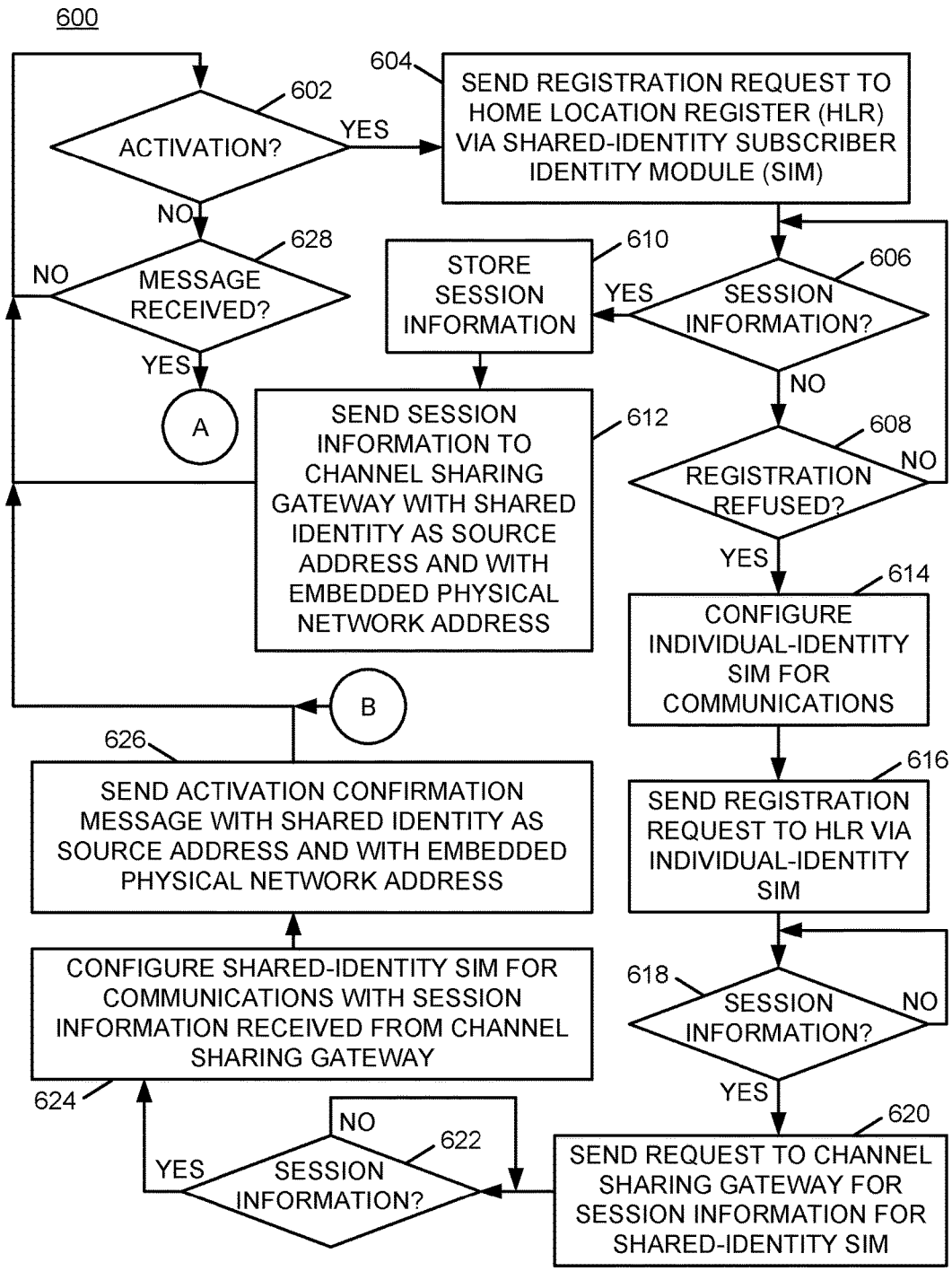
FIG. 6A is a flow chart of an example of an implementation of initial processing within a process associated with wireless physical devices for automated multi-device monitoring and control using intelligent device channel sharing according to an embodiment of the present subject matter.
Figure 6B:
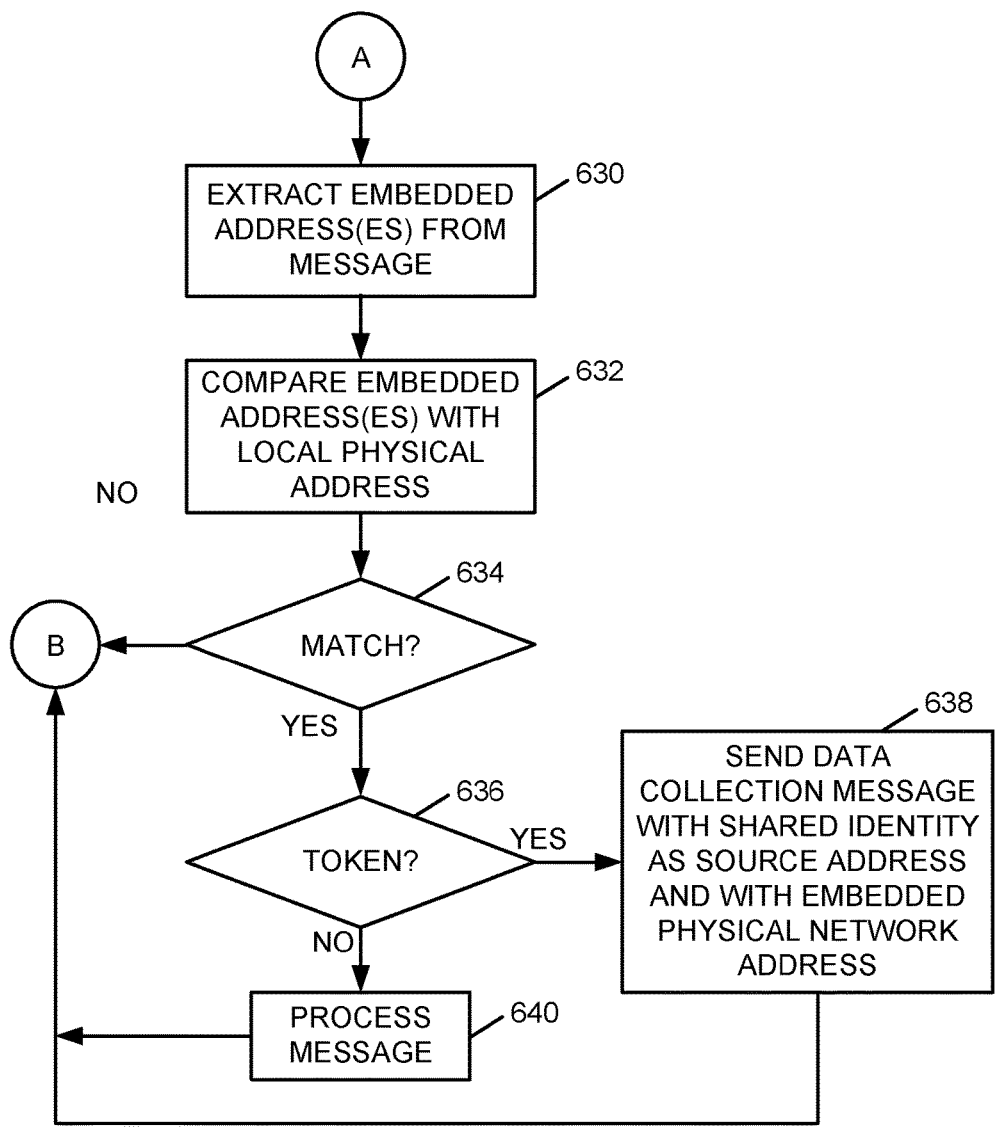
FIG. 6B is a flow chart of an example of an implementation of additional processing within a process associated with wireless physical devices for automated multi-device monitoring and control using intelligent device channel sharing according to an embodiment of the present subject matter.

FIGS. 6A-6B illustrate a flow chart of an example of an implementation of a process 600 associated with wireless physical devices, such as the physical device_1 116 through the physical device_M 126, for automated multi-device monitoring and control using intelligent device channel sharing. FIG. 6A illustrates initial processing within the process 600. At decision point 602, the process 600 makes a determination as to whether a device activation sequence is in process. A device activation sequence may result from a power cycle or reboot of the physical device, or may be caused by other processing as appropriate for the given implementation. Processing for a negative determination at decision point 602 will be described in detail further below. In response to determining at decision point 602 that a device activation sequence is in process, the process 600 sends a registration request, as appropriate for the given implementation, to the home location register (HLR) 140 via the shared-identity SIM 216. This initial attempt to register with the HLR 140 via the shared-identity SIM 216 may be successful if this is the first registration attempt from a physical device among the respective logical device group. Otherwise, the registration attempt may fail, which will provide information that at least one other physical device within the logical group may already registered to use the shared-identity SIM 216.

At decision point 606, the process 600 makes a determination as to whether session information (e.g., encryption key(s), etc.) for use with the shared-identity SIM 216 has been received. For purposes of the present example, it is assumed that this iteration of processing is performed by the first physical device to attempt to register. In response to determining that the session information for use with the shared-identity SIM 216 has not been received, the process 600 makes a determination at decision point 608 as to whether the registration has been refused by the HLR 140. Because this iteration describes processing associated with the first attempt to register, it is assumed that the registration was not refused. In response to determining that the registration was not refused, the process 600 returns to decision point 606 and iterates as described above.

In response to a determination at decision point 606 that the registration was successful and that the session information has been received from the HLR 140, the process 600 stores the session information at block 610. At block 612, the process 600 sends a message with the session information using the shared logical device physical network address as the source address and the physical network address of the respective physical device embedded into the message to the channel sharing gateway 104. This sending of the session information with the embedded physical network address to the channel sharing gateway 104 also operates to register the physical device that sends the message as the first active device within the respective logical device group/pool. As such, the first physical device may be considered configured and ready to receive messaging from the channel sharing gateway 104 via the shared-identity SIM 216, as described further below. The process 600 returns to decision point 602 and iterates as described above and may begin listening for messages as described in more detail further below.

Processing performed in response to a refused registration will now be described. This processing may be performed by any device that is a second or subsequent physical device to attempt to register using the shared-identity SIM 216.

Returning to the description of decision point 608, in response to determining that the registration has been refused by the HLR 140, the process 600 configures the individual-identity SIM 218 for communications at block 614. At block 616, the process 600 sends a registration request to the HLR 140 via the individual-identity SIM 218. The process 600 makes a determination at decision point 618 as to whether session information has been received. For purposes of the present example it is assumed that this registration attempt is not refused. As such, in response to determining that session information has been received, the process 600 sends a request to the channel sharing gateway 104 for the session information for use of the shared-identity SIM 216 at block 620. This processing allows the second or subsequent physical device in the device group to obtain the session information for use of the shared communication channel of the wireless network.

At decision point 622, the process 600 makes a determination as to whether session information has been received from the channel sharing gateway 104. For purposes of the present example, it is assumed that the requesting device is registered with the channel sharing gateway 104 as part of the logical device group associated with the particular shared-identity SIM 216 and that the channel sharing gateway 104 will return the session information for use of the shared-identity SIM 216.

As such, in response to receipt of the session information for use of the shared-identity SIM 216, the process 600 configures the shared-identity SIM 216 for communications with the session information received from the channel sharing gateway 104 at block 624. At block 626, the process 600 sends an activation confirmation message with the shared logical device physical network address as the source address and the physical network address of the respective physical device embedded into the message to the channel sharing gateway 104. The channel sharing gateway 104 processes the activation confirmation and may include this second and subsequent device within the processing of message translation between the application server 102 and the respective physical devices via a single wireless communication channel via the shared-identity SIM 216. The process 600 returns to decision point 602 and iterates as described above.

Returning to the description of decision point 602, in response to determining that a device activation sequence is not in process (i.e., that the device is already activated and configured to use the shared-identity SIM 216), the process 600 makes a determination at decision point 628 as to whether a message has been received via the single wireless communication channel via the shared-identity SIM 216 from the channel sharing gateway 104. In response to determining that a message has been received via the single wireless communication channel via the shared-identity SIM 216 from the channel sharing gateway 104, the process 600 transitions to the processing shown and described in association with FIG. 6B.

FIG. 6B illustrates additional processing associated with the process 600 associated with wireless physical devices, such as the physical device_1 116 through the physical device_M 126, for automated multi-device monitoring and control using intelligent device channel sharing. At block 630, the process 600 extracts one or more embedded addresses from the message. At block 632, the process 600 compares the extracted embedded address(es) with the local physical address, such as the individual-identity SIM. At decision point 634, the process 600 makes a determination as to whether there is an address match between the local physical address and any of the extracted embedded addresses. In response to determining that there is not an address match between the local physical address and any of the extracted embedded addresses, the process 600 returns to the processing associated with FIG. 6A at decision point 602 and iterates as described above.

In response to determining at decision point 634 that there is an address match between the local physical address and one of the extracted embedded addresses, the process 600 makes a determination at decision point 636 as to whether a token is included in the message received from the channel sharing gateway 104. As described above, a token may be included in messages to cause the respective physical devices addressed within the payload of the messages to send data collected by the respective physical devices. The data gathering processing is not described herein for brevity. However, it is understood that any data gathering operations may be included within the process 600 as appropriate for a given implementation.

In response to determining that a token is included within the message, the process 600 sends a data collection message, including any collected data requested via the respective token, to the channel sharing gateway 104 at block 638 using the shared logical device physical network address as the source address and the physical network address of the respective physical device embedded into the message. In response to determining that a token is not included within the message, the process 600 processes the message at block 640. Processing of the message may include configuration options, indications to store data or information, or any other processing appropriate for a given implementation. The message may also be a broadcast message that is processed by multiple devices for such purposes. In response to either sending the data collection message at block 638 or processing the message at block 640, the process 600 returns to the processing associated with FIG. 6A at decision point 602 and iterates as described above.

As such, the process 600 determines whether registration is possible with the HLR 140 via the shared-identity SIM 216. If registration is successful via the shared-identity SIM 216, the process 600 receives session information and sends the session information to the channel sharing gateway 104 for distribution to other physical devices within the same logical group. Second and subsequent devices register with the HLR 140 using the respective individual-identity SIM 218 and communicate with the channel sharing gateway 104 to obtain the session information and to configure the shared-identity SIM 216 for communications over the single wireless communication channel using the session information received from the channel sharing gateway 104. Once registered and activated via the shared-identity SIM 216, devices process messages as directed by the channel sharing gateway 104 via tokens that identify transmission windows available to the respective physical devices via the single shared wireless channel.

Figure 7:
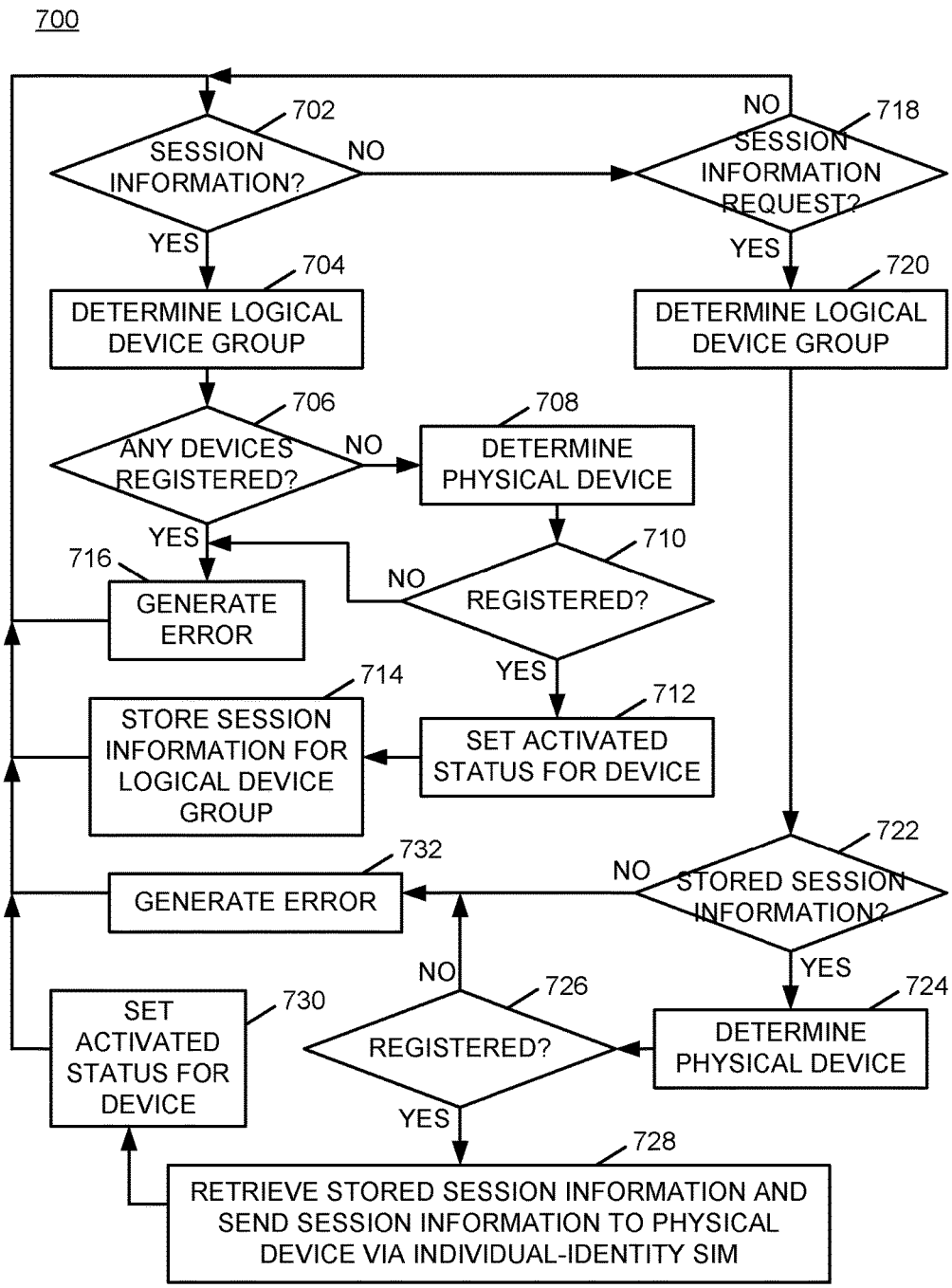
FIG. 7 is a flow chart of an example of an implementation of a process for registration of physical devices at a channel sharing gateway for automated multi-device monitoring and control using intelligent device channel sharing according to an embodiment of the present subject matter.

FIG. 7 is a flow chart of an example of an implementation of a process 700 for registration of physical devices at a channel sharing gateway, such as the channel sharing gateway 104, for automated multi-device monitoring and control using intelligent device channel sharing. At decision point 702, the process 700 makes a determination as to whether session information for a shared-identity SIM, such as the shared-identity SIM 216, for a logical device group/pool has been received. The process 700 receives the session information from authorized physical devices via the shared-identity SIM 216. As such, the process 700 may receive wireless session information for cellular communication with the logical device group from the one of the wireless physical devices in the logical device group, as described above.

In response to determining that session information for a shared-identity SIM for a logical device group/pool has been received, the process 700 determines the logical device group with which the session information is associated at block 704. This determination may include extracting the shared logical device physical network address from the source address area of a packet header.

At decision point 706, the process 700 makes a determination as to whether any devices are currently registered as active devices within the logical device group. Receipt of session information from devices associated with a logical device group where another device is already registered as an active device within a logical device group may be considered an error condition. In response to determining that no devices are currently registered as active devices within the logical device group, the process 700 determines the physical device from which the session information was received at block 708. This determination may include extracting the physical network address from the payload of the data packet within which the session information was received.

At decision point 710, the process 700 makes a determination as to whether the identified physical device is registered with the logical device group as an authorized device within the logical device group. In response to determining that the identified physical device is registered with the logical device group as an authorized device within the group, the process 700 sets an activated status for the physical device at block 712. At block 714, the process 700 stores the session information (e.g., wireless session information) for the logical device group.

In response to either determining at decision point 706 that at least one device is currently registered as an active device within the logical device group or in response to determining at decision point 710 that the identified physical device is not registered with the logical device group as an authorized device within the logical device group, the process 700 generates an error at block 716, which may include logging the error, or generating a message (e.g., email, text, or otherwise) that informs an administrator of the error. The process 700 returns to decision point 702 and iterates as described above.

Returning to the description of decision point 702, in response to determining that session information has not been received, the process 700 makes a determination at decision point 718 as to whether a request for session information has been received from a second or subsequent device within the logical device group via a communication initiated by the second of the plurality of wireless physical devices using an individual-identity SIM 218. In response to determining that a request for session information has been received from a second or subsequent device within the logical device group, the process 700 determines the logical device group with which the request for session information is associated at block 720. This determination may include extracting the shared logical device physical network address from the source address area of a packet header.

At decision point 722, the process 700 makes a determination as to whether any session information is stored for the logical device group. Absence of stored session information may be considered an error condition. In response to determining that session information is stored for the logical device group, the process 700 determines the physical device from which the request for session information was received at block 724. This determination may include extracting the physical network address from the payload of the data packet within which the session information was received. In this branch of the processing, as described above, the physical network address may be the individual-identity SIM 218 of the respective physical device.

At decision point 726, the process 700 makes a determination as to whether the identified physical device is registered with (as part of) the logical device group as an authorized device within the logical device group. In response to determining that the identified physical device is registered with the logical device group as an authorized device within the group, the process 700 retrieves the stored session information and sends the session information to the requesting physical device using the physical network address associated with the individual-identity SIM 218 at block 728. At block 730, the process 700 sets an activated status for the physical device, which adds the second or subsequent physical device as an active device within a token rotation with other active wireless physical devices of the logical device group/pool.

In response to either determining at decision point 722 that session information is not stored for the logical device group or in response to determining at decision point 726 that the identified physical device is not registered with the logical device group as an authorized device within the logical device group, the process 700 generates an error at block 732, which may include logging the error, or generating a message (e.g., email, text, or otherwise) that informs an administrator of the error. In response to either generating the error at block 732 or in response to setting the activated status for the physical device at block 730, the process 700 returns to decision point 702 and iterates as described above.

As such, the process 700 operates to receive and store wireless session information for logical device groups and performs confirmations to verify authenticity of the devices from which the wireless session information is received. The process 700 receives the session information from authorized physical devices via the shared-identity SIM 216. The process 700 also processes requests from second and subsequent physical devices within the logical device groups for wireless session information, and performs confirmations to verify authenticity of the devices from which the requests for the wireless session information are received. The process 700 sends the session information to authorized physical devices via the individual-identity SIM 218 and adds authorized subsequent physical devices as active devices.

As described above in association with FIG. 1 through FIG. 7, the example systems and processes provide automated multi-device monitoring and control using intelligent device channel sharing. Many other variations and additional activities associated with automated multi-device monitoring and control using intelligent device channel sharing are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    translating, in response to receipt of a first data packet addressed to a physical network address of one of a plurality of wireless customer-premise monitoring devices from an application server, the physical network address to a shared logical device physical network address that forms a logical device group and that physically addresses each of the plurality of wireless customer-premise monitoring devices over a single wireless communication channel of a wireless cellular network, and where wireless customer-premise monitoring devices within the plurality of wireless customer-premise monitoring devices are configured with each of:
        a shared-identity subscriber identity module (SIM) that operates to communicate via the shared logical device physical network address; and
        an individual-identity SIM that operates to communicate via the physical network address of the respective one of the plurality of wireless customer-premise monitoring devices; and
    where the method further comprises:
        receiving wireless session information for cellular communication with the logical device group from the one of the plurality of wireless customer-premise monitoring devices;
        storing the wireless session information;
        embedding the physical network address of the one of the plurality of wireless customer-premise monitoring devices within the first data packet addressed to the shared logical device physical network address; and
        sending the first data packet to the shared logical device physical network address.

2. The method of claim 1, further comprising inserting a token in the first data packet addressed to the shared logical device physical network address to cause the one of the plurality of wireless customer-premise monitoring devices to initiate transmission of customer-premise monitoring data generated by the one of the plurality of wireless customer-premise monitoring devices.

3. The method of claim 2, further comprising:
    receiving, in a second data packet comprising a data packet source address of the shared logical device physical network address and a payload with the physical network address of the one of the plurality of wireless customer-premise monitoring devices, the customer-premise monitoring data generated by the one of the plurality of wireless customer-premise monitoring devices in response to the token inserted into the first data packet addressed to the shared logical device physical network address;
    translating the data packet source address of the second data packet from the shared logical device physical network address to the physical network address of the one of the plurality of wireless customer-premise monitoring devices; and sending the second data packet to the application server.

4. The method of claim 1, further comprising:

receiving a request for the wireless session information from a second of the plurality of wireless customer-premise monitoring devices via a communication initiated by the second of the plurality of wireless customer-premise monitoring devices using the individual-identity SIM;

retrieving the stored wireless session information; and sending the wireless session information to the second of the plurality of wireless customer-premise monitoring devices using the physical network address associated with the individual-identity SIM.

5. The method of claim 4, further comprising:

determining whether the second of the plurality of wireless customer-premise monitoring devices is registered as part of the logical device group;

where sending the wireless session information to the second of the plurality of wireless customer-premise monitoring devices using the physical network address associated with the individual-identity SIM comprises sending the wireless session information to the second of the plurality of wireless customer-premise monitoring devices using the physical network address associated with the individual-identity SIM in response to determining that the second of the plurality of wireless customer-premise monitoring devices is registered as part of the logical device group; and further comprising adding the second of the plurality of wireless customer-premise monitoring devices as an active device within a token rotation with other active devices of the plurality of wireless customer-premise monitoring devices.

6. A system, comprising:

a memory;
a communication module; and
a processor programmed to:
 translate, in response to receipt of a first data packet addressed to a physical network address of one of a plurality of wireless customer-premise monitoring devices from an application server, the physical network address to a shared logical device physical network address that forms a logical device group and that physically addresses each of the plurality of wireless customer-premise monitoring devices over a single wireless communication channel of a wireless cellular network, and where wireless customer-premise monitoring devices within the plurality of wireless customer-premise monitoring devices are configured with each of:
  a shared-identity subscriber identity module (SIM) that operates to communicate via the shared logical device physical network address; and
  an individual-identity SIM that operates to communicate via the physical network address of the respective one of the plurality of wireless customer-premise monitoring devices; and
 the processor is further programmed to:
  receive, via the communication module, wireless session information for cellular communication with the logical device group from the one of the plurality of wireless customer-premise monitoring devices;
  store the wireless session information in the memory;
  embed the physical network address of the one of the plurality of wireless customer-premise monitoring devices within the first data packet addressed to the shared logical device physical network address; and
  send, via the communication module, the first data packet to the shared logical device physical network address.

7. The system of claim 6, where the processor is further programmed to:

insert a token in the first data packet addressed to the shared logical device physical network address to cause the one of the plurality of wireless customer-premise monitoring devices to initiate transmission of customer-premise monitoring data generated by the one of the plurality of wireless customer-premise monitoring devices.

8. The system of claim 7, where the processor is further programmed to:

receive, via the communication module, in a second data packet comprising a data packet source address of the shared logical device physical network address and a payload with the physical network address of the one of the plurality of wireless customer-premise monitoring devices, the customer-premise monitoring data generated by the one of the plurality of wireless customer-premise monitoring devices in response to the token inserted into the first data packet addressed to the shared logical device physical network address;

translate the data packet source address of the second data packet from the shared logical device physical network address to the physical network address of the one of the plurality of wireless customer-premise monitoring devices; and send, via the communication module, the second data packet to the application server.

9. The system of claim 6, where the processor is further programmed to:

receive, via the communication module, a request for the wireless session information from a second of the plurality of wireless customer-premise monitoring devices via a communication initiated by the second of the plurality of wireless customer-premise monitoring devices using the individual-identity SIM;

retrieve the stored wireless session information from the memory; and send, via the communication module, the wireless session information to the second of the plurality of wireless customer-premise monitoring devices using the physical network address associated with the individual-identity SIM.

10. The system of claim 9, where the processor is further programmed to:

determine whether the second of the plurality of wireless customer-premise monitoring devices is registered as part of the logical device group;

where, in being programmed to send, via the communication module, the wireless session information to the second of the plurality of wireless customer-premise monitoring devices using the physical network address associated with the individual-identity SIM, the processor is programmed to send, via the communication module, the wireless session information to the second of the plurality of wireless customer-premise monitoring devices using the physical network address associated with the individual-identity SIM in response to determining that the second of the plurality of wireless customer-premise monitoring devices is registered as part of the logical device group; and where the processor is further programmed to add the second of the plurality of wireless customer-premise monitoring devices as an active device within a token rotation with other active devices of the plurality of wireless customer-premise monitoring devices.

11. A computer program product comprising a non-transitory computer readable storage medium including computer readable program code, where the computer readable program code when executed on a computer causes the computer to:
translate, in response to receipt of a first data packet addressed to a physical network address of one of a plurality of wireless customer-premise monitoring devices from an application server, the physical network address to a shared logical device physical network address that forms a logical device group and that physically addresses each of the plurality of wireless customer-premise monitoring devices over a single wireless communication channel of a wireless cellular network, and where wireless customer-premise monitoring devices within the plurality of wireless customer-premise monitoring devices are configured with each of:
a shared-identity subscriber identity module (SIM) that operates to communicate via the shared logical device physical network address; and
an individual-identity SIM that operates to communicate via the physical network address of the respective one of the plurality of wireless customer-premise monitoring devices; and
the computer readable program code when executed on the computer further causes the computer to:
receive wireless session information for cellular communication with the logical device group from the one of the plurality of wireless customer-premise monitoring devices;
store the wireless session information;
embed the physical network address of the one of the plurality of wireless customer-premise monitoring devices within the first data packet addressed to the shared logical device physical network address; and
send the first data packet to the shared logical device physical network address.

12. The computer program product of claim 11, where the computer readable program code when executed on the computer further causes the computer to insert a token in the first data packet addressed to the shared logical device physical network address to cause the one of the plurality of wireless customer-premise monitoring devices to initiate transmission of customer-premise monitoring data generated by the one of the plurality of wireless customer-premise monitoring devices.

13. The computer program product of claim 12, where the computer readable program code when executed on the computer further causes the computer to:
receive, in a second data packet comprising a data packet source address of the shared logical device physical network address and a payload with the physical network address of the one of the plurality of wireless customer-premise monitoring devices, the customer-premise monitoring data generated by the one of the plurality of wireless customer-premise monitoring devices in response to the token inserted into the first data packet addressed to the shared logical device physical network address;
translate the data packet source address of the second data packet from the shared logical device physical network address to the physical network address of the one of the plurality of wireless customer-premise monitoring devices; and
send the second data packet to the application server.

14. The computer program product of claim 11, where the computer readable program code when executed on the computer further causes the computer to:
receive a request for the wireless session information from a second of the plurality of wireless customer-premise monitoring devices via a communication initiated by the second of the plurality of wireless customer-premise monitoring devices using the individual-identity SIM;
retrieve the stored wireless session information; and
send the wireless session information to the second of the plurality of wireless customer-premise monitoring devices using the physical network address associated with the individual-identity SIM.

15. The computer program product of claim 14, where the computer readable program code when executed on the computer further causes the computer to:
determine whether the second of the plurality of wireless customer-premise monitoring devices is registered as part of the logical device group; and
where, in causing the computer to send the wireless session information to the second of the plurality of wireless customer-premise monitoring devices using the physical network address associated with the individual-identity SIM, the computer readable program code when executed on the computer causes the computer to send the wireless session information to the second of the plurality of wireless customer-premise monitoring devices using the physical network address associated with the individual-identity SIM in response to determining that the second of the plurality of wireless customer-premise monitoring devices is registered as part of the logical device group; and
where the computer readable program code when executed on the computer further causes the computer to add the second of the plurality of wireless customer-premise monitoring devices as an active device within a token rotation with other active devices of the plurality of wireless customer-premise monitoring devices.

* * * * *